No. 666,625. Patented Jan. 22, 1901.
J. B. TOMPKINS, Dec'd.
P. V. MOALES, Administrator.
ANIMAL TRAP.
(Application filed July 11, 1900.)
(No Model.) 2 Sheets—Sheet 1.
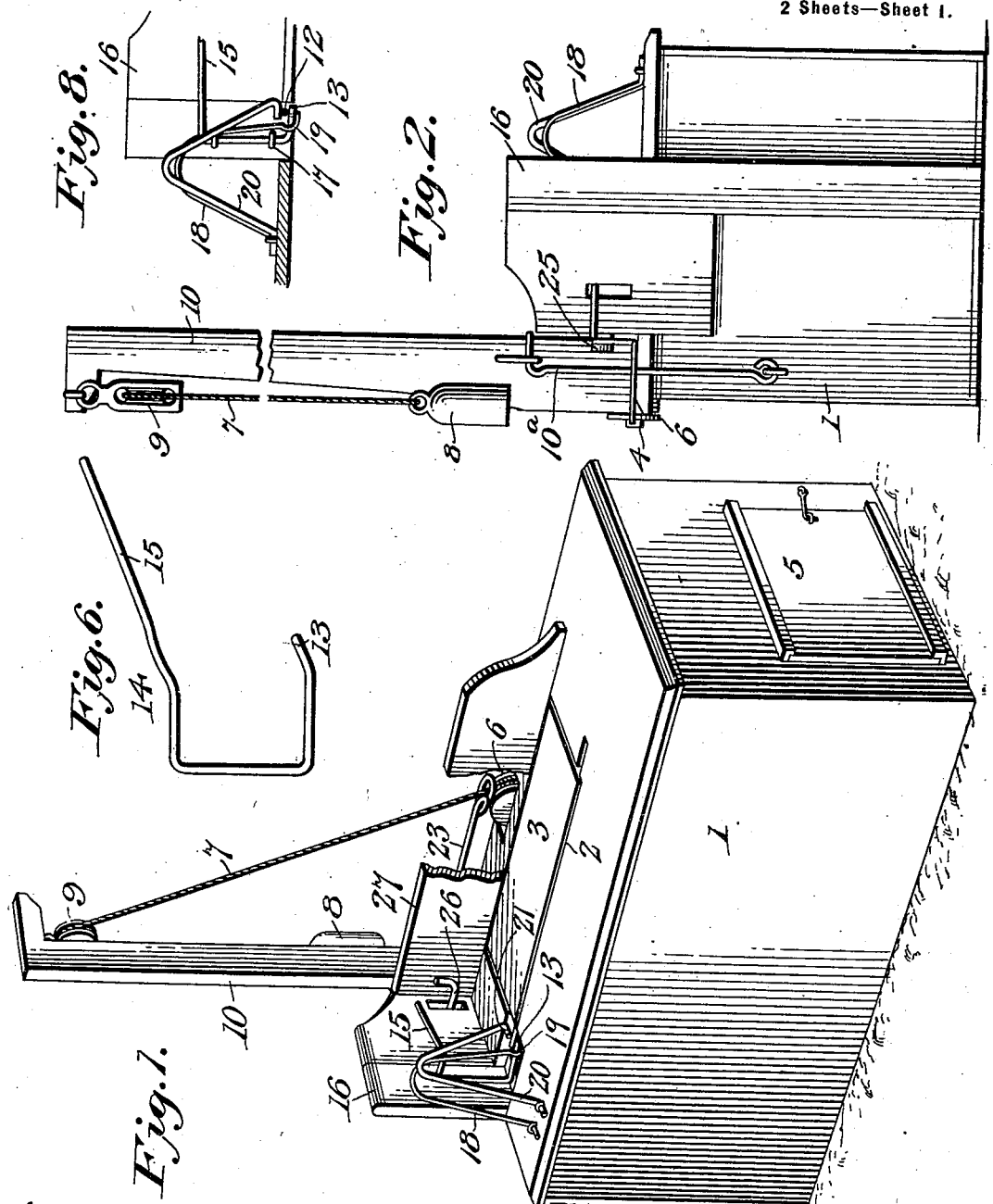
Witnesses
Edwin G. McKee
D. P. Holhau...
Pharmar V. Moales administrator
of the estate of James B. Tompkins inventor, deceased
By
Attorney

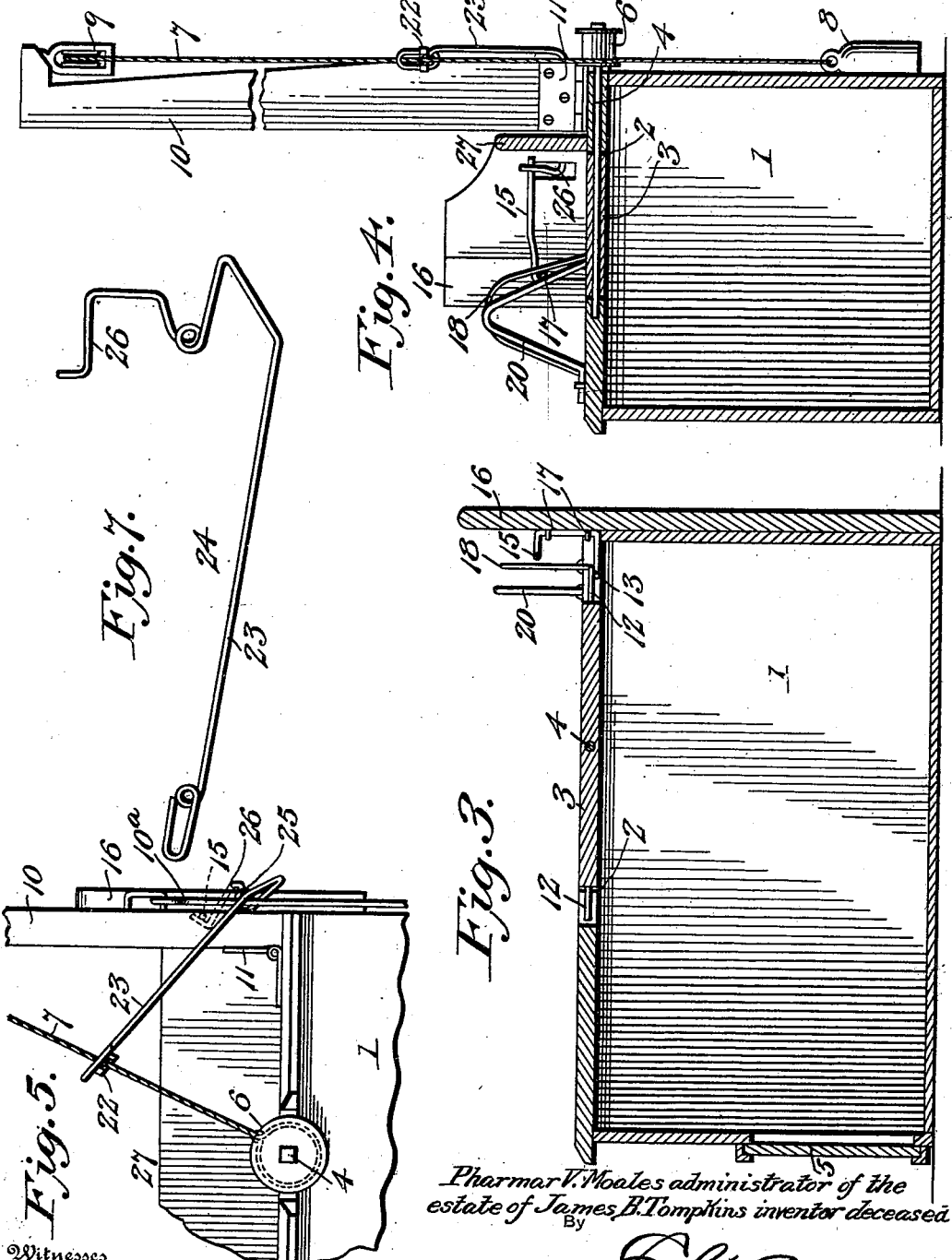

UNITED STATES PATENT OFFICE.

PHARMAR V. MOALES, OF CHARLESTON, WEST VIRGINIA, ADMINISTRATOR OF JAMES B. TOMPKINS, DECEASED.

ANIMAL-TRAP.

SPECIFICATION forming part of Letters Patent No. 666,625, dated January 22, 1901.

Application filed July 11, 1900. Serial No. 23,275. (No model.)

*To all whom it may concern:*

Be it known that I, PHARMAR V. MOALES, a citizen of the United States, residing at Charleston, in the county of Kanawha and State of West Virginia, administrator of the estate of JAMES B. TOMPKINS, deceased, late a citizen of the United States, residing at Apgah, in the county of Kanawha and State of West Virginia, (as by reference to the duly-certified copy of letters of administration now on file at the United States Patent Office will more fully appear,) do hereby declare that JAMES B. TOMPKINS invented and produced a new and useful Animal-Trap, of which the following is a specification.

The invention relates to improvements in animal-traps.

One object of the present invention is to improve the construction of self-set and ever-set animal-traps and to provide an exceedingly-sensitive one, which will be operated by the slightest attempt to obtain the bait and which will be positive and reliable in operation.

A further object of the invention is to provide means whereby, when the trap is run down the rotary trap-door will be automatically locked in its closed position to prevent any of the captured animals from escaping.

The invention consists in the construction and novel combination and arrangement of parts, as hereinafter fully described, illustrated in the accompanying drawings, and pointed out in the claims hereto appended.

In the drawings, Figure 1 is a perspective view of an animal-trap constructed in accordance with this invention. Fig. 2 is an end elevation of the same. Fig. 3 is a longitudinal sectional view. Fig. 4 is a transverse sectional view, the locking device being swung upward for holding the trigger stationary. Fig. 5 is a side elevation of a portion of the trap, the parts being arranged as shown in Fig. 4. Fig. 6 is a detail perspective view of the trigger. Fig. 7 is a similar view of the locking device. Fig. 8 is a detail sectional view illustrating the manner of supporting the trap-door in a horizontal position.

Like numerals of reference designate corresponding parts in all the figures of the drawings.

1 designates a box or casing forming a cage or receptacle for captured animals and provided at its top with an opening 2, in which is arranged a trap-door 3, mounted on a transverse shaft 4 and adapted when tripped, as hereinafter described, to precipitate a rat or other animal attracted by the bait into the box or casing. One end of the box or casing is provided with a sliding door 5, which enables the captured animals to be readily removed.

The transverse shaft 4, which carries the rotating trap-door 3, extends beyond one side of the casing and has a pulley or drum 6 fixed to it and receiving one end of a cord 7 or other suitable flexible connection, which when wound around the pulley or drum is adapted to be unwound therefrom by the action of a weight 8, whereby the trap-door is partially rotated when tripped. The weight is secured to one end of the cord 7, which passes over a pulley 9, that is supported in an elevated position by an arm or standard 10, and the latter, which is hinged at its lower end at 11 to the top of the casing, is held by a hook 10ª and is adapted to fold upon the same to enable the trap to be compactly arranged for shipping or storing. The arm or standard 10 is mounted at one end of the casing, adjacent to one side thereof, and that run of the cord which extends from the pulley or drum to the arm or standard 10 is disposed at an inclination.

The trap-door, which is oblong, as shown, is provided at each end with a longitudinal projection or finger 12, arranged to be supported by an arm 13 of a trigger 14, consisting of a rock-shaft provided at its bottom with the said arm 13 and having a bait-receiving arm 15 at its upper end. The stem or connecting portion of the trigger is disposed vertically on a support 16 and is arranged in suitable bearings 17 thereof. The lower arm 13 of the trigger is substantially L-shaped, and the outer portion is arranged to receive and extend beneath the adjacent projection or finger 12 of the trap-door, and the upper arm has an angular bend at its inner end to offset it from the support 15. The bait for attracting the animals is attached to the upper arm and may be of any character to suit the animals to be captured. When the upper arm is drawn outward by reason of an animal pulling at the bait, the lower arm is swung from beneath the supported projection or finger and the trap-door is rapidly rotated one-half a revolution by the weight, thereby precipitating the animal into the casing and returning to a horizontal position for another operation. The trigger is returned to its initial position by a bowed spring 18, extending upward from the top of the casing and secured at its outer end to the same and having its inner end bearing against the lower arm of the trigger. The inner end of the spring which engages the lower arm of the trigger is provided with an angularly-disposed hook or projection 19, which extends beneath the lower arm 13, so that there is no liability of the hook becoming accidentally disengaged from the trigger.

In order to prevent the supported end of the trap-door from swinging upward when its other end is subjected to the weight of an animal, a spring 20 is provided and is arranged adjacent to the spring 18. The spring, which is constructed of heavier material than the trigger-engaging spring, is substantially V-shaped, its outer side being secured to the casing and its inner side being provided with a horizontal arm or extension 21, located above the adjacent projection or finger. The inner side of the V-shaped spring is arranged at an inclination and is readily depressed and passed by the projections or fingers of the trap-door when the latter is rotated.

The cord 7 is provided a short distance from the end that is secured to the drum or pulley with a projection 22, arranged to engage one arm 23 of a locking device 24, which is pivotally mounted on the back at one end thereof at 25. The arm 23, which is substantially L-shaped, extends around the arm or standard 10 and is provided at its outer end with an eye or opening through which the cord passes. The locking device is provided at its outer end with an angularly-bent arm 26, extending through an opening of the support 16 and located beneath the upper arm of the trigger. The arm 26 of the locking device is provided at its outer end with a projection or hook which when swung upward is adapted to engage and hold the upper arm of the trigger against the support 16, whereby the trap-door is locked out of operation, so that when the trap is run down the door cannot be accidentally opened and permit any of the captured animals to escape. As the last of the cord is unwound from the pulley or drum of the transverse shaft the projection engages the outer arm of the locking device and swings the same upward to the position illustrated in Figs. 4 and 5 of the accompanying drawings. The support 16 preferably consists of an end wall or flange, and the casing is also provided with a longitudinal side wall or flange 27, as clearly shown in the drawings.

It will be noted that the weight 8 and its connections constitute a motor and may be said to be run down when it has moved to such position as to render it ineffective for the further operation of the door.

The invention has the following advantages: The trap, which is self-setting, is simple and comparatively inexpensive in construction, and it is exceedingly sensitive and positive and reliable in operation. The slightest pull on the bait trips the trap-door, and after the trap has run down the trap-door is automatically locked out of operation, so that it cannot be accidentally opened and permit the escape of any of the captured animals.

Changes in the form, proportion, and minor details of construction may be resorted to without departing from the spirit or sacrificing any of the advantages of this invention.

What is claimed is—

1. A trap comprising a casing, a trap-door, a trigger retaining said door, and door-operating mechanism operatively connected with the trigger to lock it in an inoperative position.

2. A trap comprising a casing, a trap-door, a trigger therefor, door-operating mechanism, and means operated by said mechanism to lock the door in an inoperative position.

3. A trap comprising a frame or casing, a rotary trap-door, a trigger, and a substantially V-shaped spring having an inclined arm located above the trap-door and provided at its lower end with an extension, substantially as described.

4. A trap comprising a frame or casing, a rotary trap-door, a trigger supporting the trap-door, operating mechanism for rotating the latter, and a locking device arranged to engage the trigger for holding the trap-door in its closed position, said locking device being arranged to be actuated by the operating mechanism, substantially as described.

5. A trap comprising a frame or casing, a rotary trap-door having a drum or pulley, a cord wound around the drum or pulley and provided with a weight, said cord being provided with a projection, a trigger, and a locking device arranged to be actuated by the projection of the cord and adapted to engage the trigger, substantially as described.

6. A trap comprising a frame or casing, a rotary trap-door having a drum, a cord wound around the drum and provided with a weight, a trigger, and a pivotally-mounted locking device having an arm for engaging the trigger at one end, its other end being arranged to be operated by the said cord, substantially as described.

7. A trap comprising a frame or casing, a rotary trap-door, a trigger consisting of a rock-shaft and having a bait-receiving arm, and provided with an arm for supporting the trap-door, a locking device pivoted between its ends and having one end arranged to engage the trigger, and a weighted cord connected with the trap-door and arranged to engage the other arm of the locking device, substantially as described.

8. A trap comprising a casing, a trap-door, door-operating mechanism comprising a motor, and automatically-operative means for locking the door against further operation when the motor is run down.

9. A trap comprising a casing, a movable trap-door, a trigger retaining said door, door-operating mechanism, and a locking device for locking the trigger in an inoperative position.

10. A trap comprising a casing, a movable trap-door, a trigger retaining said door, door-operating mechanism comprising a motor and a locking device arranged for engagement with the trigger, and means for operating the locking device as the motor becomes ineffective.

In testimony that I claim the foregoing as the invention of JAMES B. TOMPKINS I have hereto affixed my signature in the presence of two witnesses.

PHARMAR V. MOALES,
*Administrator of the estate of James B. Tompkins, deceased.*

Witnesses:
WILLIS PETTIT,
HOWARD C. SMITH.